United States Patent
Kazmi et al.

(10) Patent No.: US 9,854,044 B2
(45) Date of Patent: Dec. 26, 2017

(54) METHOD AND ARRANGEMENT FOR HANDLING DEVICE-TO-DEVICE COMMUNICATION IN A WIRELESS COMMUNICATIONS NETWORK

(75) Inventors: Muhammad Kazmi, Bromma (SE); Gabor Fodor, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 65 days.

(21) Appl. No.: 14/347,162

(22) PCT Filed: Sep. 30, 2011

(86) PCT No.: PCT/SE2011/051164
§ 371 (c)(1),
(2), (4) Date: Mar. 25, 2014

(87) PCT Pub. No.: WO2013/048296
PCT Pub. Date: Apr. 4, 2013

(65) Prior Publication Data
US 2014/0256334 A1    Sep. 11, 2014

(51) Int. Cl.
*H04L 29/08* (2006.01)
*H04L 5/00* (2006.01)
(Continued)

(52) U.S. Cl.
CPC .......... *H04L 67/141* (2013.01); *H04L 5/0037* (2013.01); *H04L 67/1061* (2013.01);
(Continued)

(58) Field of Classification Search
None
See application file for complete search history.

(56) References Cited

U.S. PATENT DOCUMENTS

2009/0017843 A1   1/2009   Laroia et al.
2009/0319613 A1*  12/2009  Hjelm et al. ................. 709/204
(Continued)

FOREIGN PATENT DOCUMENTS

WO    WO 2010/006649    1/2010
WO    WO 2011/063845    6/2011
(Continued)

OTHER PUBLICATIONS

Extended European Search Report issued by the EPO for Application No./Patent No. 11872928.4-1857/2761951 PCT/SE2011/051164 dated Apr. 23, 2015.
(Continued)

*Primary Examiner* — King Poon
*Assistant Examiner* — Vincent Peren
(74) *Attorney, Agent, or Firm* — Baker Botts, LLP

(57) ABSTRACT

A method in a radio network node for handling a Device-to-Device, D2D, communication is provided. The D2D communication is wireless, and the radio network node is comprised in a wireless communication system. After receiving (201) from a first user equipment, an indication of resources that are currently available in the first user equipment for D2D communication, the radio network node identifies (202) whether or not the first user equipment currently has capacity for a D2D communication based on the received indication. The resources relates to hardware resources, to combined hardware resources and radio resources, or to combined software resources, hardware resources and radio resources.

18 Claims, 4 Drawing Sheets

(51) Int. Cl.
 H04W 28/18 (2009.01)
 H04W 76/02 (2009.01)
 H04W 88/06 (2009.01)
 H04W 92/18 (2009.01)
(52) U.S. Cl.
 CPC ......... *H04W 28/18* (2013.01); *H04W 76/023* (2013.01); *H04W 88/06* (2013.01); *H04W 92/18* (2013.01)

(56) References Cited

U.S. PATENT DOCUMENTS

| | | | | |
|---|---|---|---|---|
| 2009/0325625 A1* | 12/2009 | Hugl | ............... | H04W 52/16 455/522 |
| 2010/0009675 A1* | 1/2010 | Wijting et al. | ............... | 455/426.1 |
| 2010/0093364 A1 | 4/2010 | Ribeiro et al. | | |
| 2010/0261469 A1* | 10/2010 | Ribeiro | ............... | H04W 99/00 455/423 |
| 2011/0082940 A1* | 4/2011 | Montemurro | ............... | H04L 69/24 709/227 |
| 2011/0237231 A1* | 9/2011 | Horneman | ............... | H04W 76/048 455/414.1 |
| 2011/0312331 A1* | 12/2011 | Hakola et al. | ............... | 455/452.2 |
| 2012/0020213 A1* | 1/2012 | Horneman | ............... | H04W 76/043 370/231 |
| 2012/0026940 A1* | 2/2012 | Barbieri | ............... | H04L 5/0032 370/328 |
| 2012/0129540 A1* | 5/2012 | Hakola | ............... | H04W 72/042 455/450 |
| 2012/0290650 A1* | 11/2012 | Montuno | ............... | H04W 4/008 709/204 |
| 2013/0012221 A1* | 1/2013 | Zou et al. | ............... | 455/452.1 |
| 2013/0150051 A1* | 6/2013 | Van Phan | ............... | H04W 12/04 455/437 |
| 2013/0230032 A1* | 9/2013 | Lu | ............... | H04W 76/043 370/336 |
| 2014/0010209 A1* | 1/2014 | Hakola | ............... | H04W 24/02 370/336 |
| 2015/0063206 A1* | 3/2015 | Kneckt | ............... | H04W 16/14 370/328 |

FOREIGN PATENT DOCUMENTS

WO   WO 2011/087408 A1   7/2011
WO   WO 2011/096855      8/2011

OTHER PUBLICATIONS

Doppler K., Yu C.H., Ribeiro C., Janis P., Mode selection for Device-to-Device Communication underlay an LTE-Advanced Network, IEEE Wireless Communications and Networking Conference (WCNC), Sydney, Australia, Apr. 2010.

International Search Report for International Application No. PCT/SE2011/051164, dated Jun. 29, 2012.

"Power optimization of device-to-device communication underlaying cellular communication" by Chia-Hao Yu and Olav Tirkkonen (Helsinki University of Technology (TKK)) and Klaus Doppler and Cassio Ribeiro (Wireless Systems and Services Laboratory; Nokia Research Center), 2009.

"Mode selection for Device-to-Device Communication underlaying an LTE-Advanced Network" by Klaus Doppler, Chia-Hao Yu, Cassio B. Ribeiro, and Pekka Janis, 2010.

"Toward Proximity-Aware Internetworking" by M. Scott Corson, Rajiv Laroia, Junyi Li, Vincent Park, Tom Richardson, and George Tsirtsis, Qualcomm Inc., Dec. 2010.

* cited by examiner

METHOD AND ARRANGEMENT FOR HANDLING DEVICE-TO-DEVICE COMMUNICATION IN A WIRELESS COMMUNICATIONS NETWORK

PRIORITY

This nonprovisional application is a U.S. National Stage Filing under 35 U.S.C. § 371 of International Patent Application Serial No, PCT/SE2011/051164, filed Sep. 30, 2011 and entitled "Method and Arrangement for Handlng Device-to-Device Communication in A Wireless Communications Network,"

TECHNICAL FIELD

Embodiments herein relate to a radio network node and a method therein. In particular, it relates to handling Device-to-Device (D2D) communication.

BACKGROUND

Communication devices such as User Equipments (UE) are also known as e.g. mobile terminals, wireless terminals and/or mobile stations. User equipments are enabled to communicate wirelessly in a wireless communications system or wireless communication system, sometimes also referred to as a cellular radio system or cellular networks. The communication may be performed e.g. between two user equipments, between a user equipment and a regular telephone and/or between a user equipment and a server via a Radio Access Network (RAN) and possibly one or more core networks, comprised within the wireless communications system.

User equipments may further be referred to as mobile telephones, cellular telephones, or laptops with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as user equipment or a server.

The wireless communications system covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP GSM EDGE Radio Access Network (GERAN), a user equipment has a multi-slot class, which determines the maximum transfer rate in the uplink and downlink direction. EDGE is an abbreviation for Enhanced Data rates for GSM Evolution. In the end of 2008 the first release, Release 8, of the 3GPP Long Term Evolution (LTE) standard was finalized and later releases have also been finalized.

In the context of this disclosure, the expression Downlink (DL) is used for the transmission path from the base station to the mobile station. The expression Uplink (UL) is used for the transmission path in the opposite direction i.e. from the mobile station to the base station.

In network assisted Device-to-Device (D2D) communications, a network such as a radio access network assists user equipments that are in the proximity of each other to discover one another, referred to as device discovery, and establish a direct link referred to as D2D bearer establishment, rather than a link via the base station 110. In fact, when two user equipments communicate with each other via a cellular base station, the communication path involves an uplink and a downlink, both with associated resources, as opposed to the single hop direct D2D link.

Network assisted D2D communication refers to two distinct cases in terms of the number of base stations or wireless access points, such as eNB, that are involved. In a single eNB case, both user equipments are connected or camp on, i.e. are served by the same eNB. In a multiple eNB case, the two devices that are candidates for direct D2D communications are served by different eNBs.

In network assisted device discovery the radio access network may, for example, allocate resources for beacon signals, so that transmitting and receiving user equipments know what time and frequency resources being used for device discovery, that is when and at what frequencies beacons should be transmitted and scanned for or received. Alternatively, a user equipment may register at the network for D2D communications. Subsequently, another user equipment may inquire the network for possible peers allowing the network to mediate between, basically to match, the user equipments in finding each other.

The initiation of the establishment of the D2D link may be made by the radio access network or by any of the user equipments of the D2D pair. In network initiated D2D link establishment, the network realizes that two communicating user equipments are in the proximity of each other. In user equipment initiated D2D link establishment, the user equipments discover the proximity of each other and also some of their capabilities which is necessary for them to establish a D2D link, similar to Bluetooth. In both cases, since communication takes place in operator licensed spectrum, current methods allow the eNB, or other network node in the RAN, to control the actually used resources by the D2D link.

In network assisted D2D bearer establishment the network indicates to the devices which time and frequency resources and what transmit power levels they should use for the direct communication. The network may subsequently send periodic commands to the D2D pair regarding the resources that they should use for the direct D2D link. That way, the devices of the D2D pair maintain a cellular control plane, while the user plane is established directly between the devices.

In network assisted D2D communication scenarios, D2D capable user equipments requires to be able to maintain simultaneous D2D and cellular links. These parallel links may be used for the exchange of user plane as well as control plane information. The user equipments that may be candidates for D2D communications may have very different capabilities, ranging from small devices with limited Input/Output (I/O) capabilities to smart phones, tablets and laptops.

In network assisted D2D, prior art techniques allow user equipments in D2D mode to receive paging and control messages from the cellular network. Also, some application on a user equipment may want to establish a cellular connection with its current serving eNB in order to communicate with the core network, while maintaining the D2D link, i.e. simultaneous cellular and D2D communication capability.

If the user equipment needs most of its power resources for maintaining the D2D link, it may not have sufficient resources to schedule uplink cellular traffic to the eNB. Similarly, if the user equipment needs most of its processing power to manage its ongoing cellular links, it may not have sufficient remaining processing power to maintain a D2D link. Therefore, because D2D capable user equipments may open multiple communication sessions at the same time, the quality of the simultaneous sessions may suffer due to the inherent available resources.

SUMMARY

It is therefore an object of embodiments herein to provide a way of improving the handling of D2D, communications in a wireless communication system.

According to a first aspect of embodiments herein, the object is achieved by a method in a radio network node for handling a Device-to-Device, D2D, communication. The D2D communication is wireless and the radio network node is comprised in a wireless communication system.

After receiving from a first user equipment, an indication of resources that are currently available in the first user equipment for D2D communication, the radio network node identifies whether or not the first user equipment currently has capacity for a D2D communication based on the received indication. The resources relates to hardware resources, to combined hardware resources and radio resources, or to combined software resources, hardware resources and radio resources.

According to a second aspect of embodiments herein, the object is achieved by a radio network node for handling a Device-to-Device, D2D, communication. The D2D communication is wireless and the radio network node is comprised in a wireless communication system. The radio network node comprises a receiving port configured to receive from a first user equipment, an indication of resources that are currently available in the first user equipment for D2D communication. The resources relates to hardware resources, to combined hardware resources and radio resources, or to combined software resources, hardware resources and radio resources. The radio network node further comprises an identifying unit configured to identify whether or not the first user equipment currently has capacity for a D2D communication based on the received indication.

Since the radio network node bases the identification whether or not the first user equipment currently has capacity for a D2D communication based on the received indication of resources that are currently available in the first user equipment for D2D communication, less simultaneous communication sessions will be opened for D2D capable user equipments wherein the quality of the simultaneous sessions suffers due to the inherent resource such as memory or buffer status, processing capacity and transmit power limitations of a user equipment.

An advantage of embodiments herein is that radio network nodes and/or user equipments may decide more efficiently on the communication mode between peer devices and thereby maintaining satisfactory service quality in cellular networks that support direct device-to-device communications.

A further advantage according to embodiments herein is that the radio network nodes and/or user equipments make the decision based on communication mode that is adapted to the available UE resources and thereby the user equipment experience, which may be referred to as so called quality of end user experience, is enhanced.

A yet further advantage according to embodiments herein is that the establishment of the D2D communication link or cellular communication link becomes more fail proof since internal resource status is known to the radio access network.

A still further advantage according to embodiments herein is that the internal resource status information will enable the radio access network to assign adequate resources which the user equipment may handle for D2D and/or cellular communications.

BRIEF DESCRIPTION OF THE DRAWINGS

Examples of embodiments herein are described in more detail with reference to attached drawings in which.

DETAILED DESCRIPTION

Figure 1:
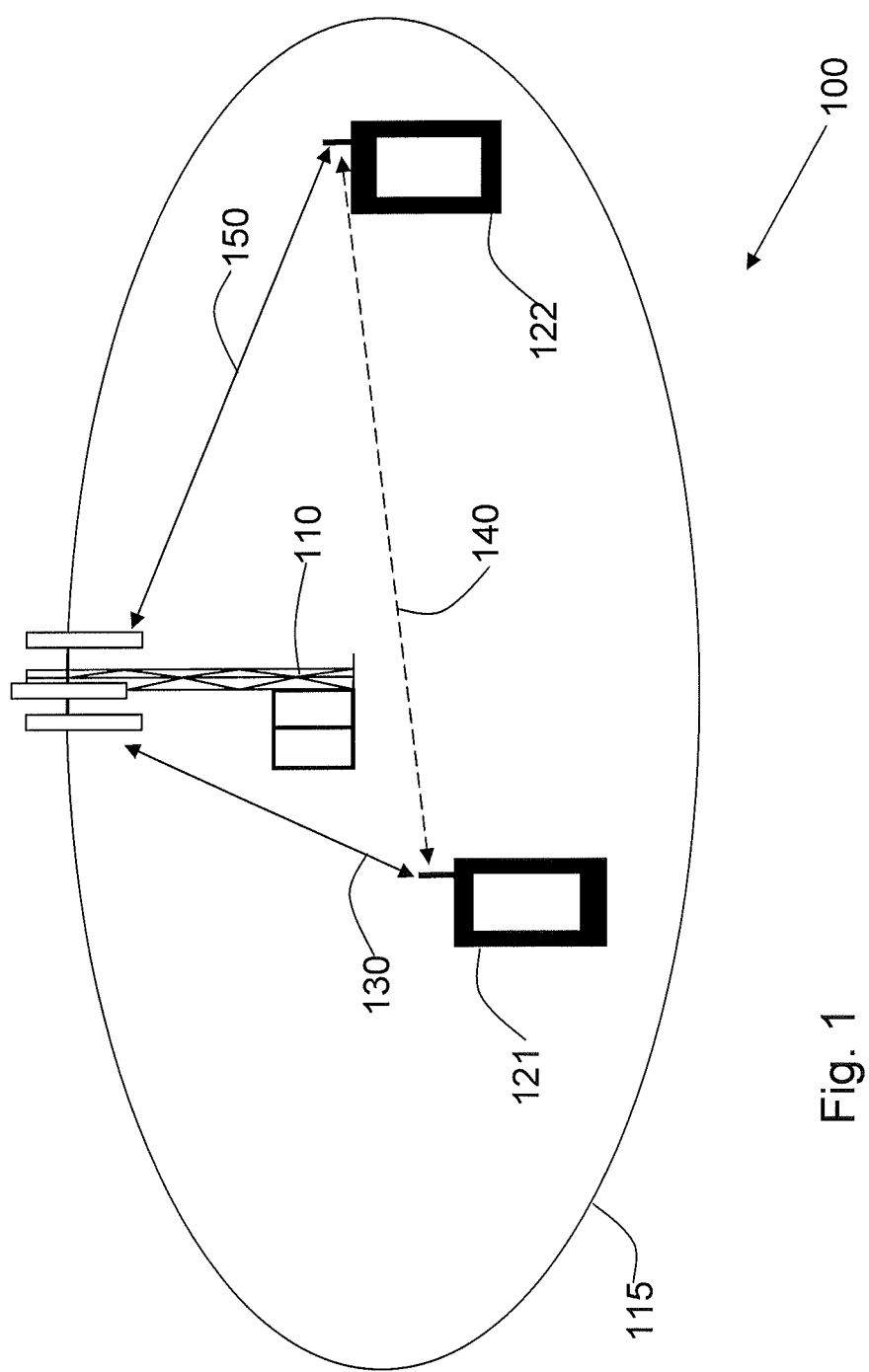
FIG. 1 is a schematic block diagram illustrating embodiments in a wireless communications system.

As part of the solution according to embodiments herein, a problem will first be identified and discussed.

UE Capabilities to Support Network Assisted D2D Communications

In order for the network to provide assistance for both D2D candidate discovery and D2D bearer establishment, the network has to be aware of certain user equipment capabilities that may be grouped into two categories:

Static or slowly changing capabilities. Such capabilities include the frequency band(s) and radio access technologies that the user equipment supports, supported modulation and coding schemes, antenna capabilities, and maximum transmit power.

Dynamic or fast changing capabilities. Such capabilities include the instantaneously available processing power, memory resources, the unused power (i.e. power resources left over for D2D communications).

Depending on the static and dynamic capabilities, the network may assist the devices to discover each other in different ways. For example, if the network instructs a device to broadcast beacon signals and another device to scan for such a beacon signal, the transmit power and the applied modulation and coding of the beacon may depend on the capabilities of the user equipments involved in the discovery process.

Likewise, for D2D bearer establishment, the static as well as the dynamic capabilities are taken into account when the network allocates time, frequency and power resources for the D2D bearer. For example, if both user equipments have sufficient power resources, e.g. they are currently not engaged in cellular communications, the eNB may decide on direct D2D communication mode even if the D2D distance is relatively high, in the order of hundreds of meters.

First Scenario, Network Assisted D2D Communications

When the user equipments communicate in D2D mode, they simultaneously communicate with an eNB to receive paging messages from the core network and to receive control messages that may indicate which resources should be used for the D2D link, to transmit measurement reports to the eNB.

In network assisted D2D communication according to a first scenario, a first user equipment UE-A has an ongoing cellular connection with an eNB, when UE-A and a second user equipment UE-B discover each other for D2D communication. UE-A is in cellular connected mode transmitting and receiving data to and from the eNB, while UE-B is in idle mode continuously executing cell reselection, using state of the art methods.

As discussed above, UE-A may also periodically transmit beacon signals for assisting potential D2D peers to discover the presence and some characteristics of UE-A. For example, UE-A may advertise its public identity or a list of applications or services that it can be engaged in or provide for interested peers.

Assuming that both are D2D capable, UE-B may use prior art techniques to discover UE-A, including UE-A's physical proximity, the services or applications it is willing to run in D2D mode and/or its identity. Prior art discovery mechanisms allow UE-B to discover that for an upcoming communication session with UE-A, the session can advantageously be established directly on a D2D bearer rather than via the cellular network.

Second Scenario, Network Assisted D2D Communications

In network assisted D2D communication according to a second scenario, UE-A and UE-B have an ongoing communication session over the direct D2D bearer when UE-A receives a paging message from the cellular network and wants to establish a cellular session.

As mentioned above, in network assisted D2D, prior art techniques allow user equipments in D2D mode to receive paging and control messages from the cellular network. Also, some application on UE-A may want to establish a cellular connection with its current serving eNB in order to communicate with the core network, while maintaining the D2D link, i.e. simultaneous cellular and D2D communication capability.

Cellular bearer parameters that characterize the communication link between the user equipment and the network also depend on the static and dynamic user equipment capabilities and resources. For example, if the user equipment needs most of its power resources for maintaining the D2D link, it may not have sufficient resources to schedule uplink cellular traffic to the eNB. Similarly, if the user equipment needs most of its processing power to manage its ongoing cellular links, it may not have sufficient remaining processing power to maintain a D2D link.

To sum up, in network assisted D2D communication scenarios, D2D capable user equipments requires be able to maintain simultaneous D2D and cellular links. These parallel links may be used for the exchange of user plane as well as control plane information. The user equipments that may be candidates for D2D communications may have very different capabilities, ranging from small devices such as e.g. wireless sensors or actuators with limited Input/Output (I/O) capabilities to smart phones, tablets and laptops.

The available user equipment resources for supporting the simultaneous cellular and D2D links include static and dynamic user equipment resources. Network assisted D2D discovery and direct bearer establishment as well as the cellular radio bearer characteristics critically depend on the availability of these static and dynamic user equipment resources.

Problem

In D2D communication scenarios in which a user equipment is engaged in simultaneous sessions, there is a potential resource problem to handle the multiple interfaces, multiple connections and multiple sessions. The problem is that a user equipment, depending on its capabilities, e.g. laptop, tablet, or cellular phone, and resource situation, e.g. connected to an external power supply or running on battery, being in the cell center or at the cell edge, may not be able to support multiple connections at the same time due to its limited processor, memory, battery and/or power resources.

For example, in the first scenario, UE-B should not initiate a D2D session with UE-A unless UE-A has sufficient resources to support the D2D link with UE-B while maintaining sufficient communication quality on the cellular link. In other words, while UE-B can use prior art methods to discover UE-A, prior art methods do not allow UE-B to learn UE-A's currently ongoing sessions and its current resource situation. For example UE-A may be D2D capable, but it cannot have a simultaneous D2D and cellular link other than maybe paging and rudimentary control signaling. For example, UE-A may be at the cell edge and operating in power limited mode, in which case UE-A uses its full battery resources to maintain the cellular communication link and to reach an SINR target. Likewise, UE-A may be uploading a large file to the cellular network using most of its memory resources for data buffering purposes.

In the second scenario, wherein UE-A and UE-B communicate in D2D mode, UE-A may not have sufficient resources to maintain a cellular link. In such a situation, when the eNB initiates a connection towards UE-A, the quality of the D2D session as well as the cellular session may severely degrade due to insufficient battery or processing resources of UE-A.

Therefore, because D2D capable user equipments may open multiple communication sessions at the same time, the quality of the simultaneous sessions may suffer due to the inherent resource such as memory or buffer status, processing capacity and transmit power limitations of the user equipment.

This problem is different from the user equipment running multiple parallel sessions towards a cellular base station such as the eNB, because in the mixed cellular and D2D mode, the user equipment needs to maintain two transmit/receive chains and separate memory resources for the cellular and the D2D communications.

The root of the problem is that in network assisted device discovery and D2D bearer establishment using prior art techniques, the network is unaware of the current status, in terms of dynamic resources, of the devices.

Embodiments will be exemplified in the following non-limiting description.

According to embodiments herein a mechanism is provided to let the serving radio network node, e.g. eNB, know of the current status of internal user equipment resources that the user equipment is capable of using for D2D communication purposes, and to consider the user equipment internal resources when determining the capability of D2D communication mode rather than consider external resources such as available time/frequency resources or interference conditions.

In some embodiments, the serving radio network node uses this information when the serving radio network node assists the D2D discovery process and the D2D bearer establishment in the case when the eNB initiates the D2D connection.

In some embodiments, the radio network node such as the eNB broadcasts information about the user equipments that are currently in the serving area of the radio network node in order to allow user equipments to learn the current D2D capabilities of other user equipments in the cell. This is useful in the case when the user equipments autonomously initiate the D2D connection.

In some further embodiments, the radio network node such as the eNB uses the reported information to determine the maximum user equipment achievable data rate on the user equipment—eNB link. For delay tolerant traffic, the radio network node such as the eNB may even decide not to initiate data transmission on the cellular link while the internal resources of the user equipment are used for the D2D communication.

FIG. 1 depicts a wireless communications system 100 in which embodiments herein may be implemented. The cellular communications system 100 is a wireless communication network such as an LTE, WCDMA, GSM network, any 3GPP cellular network, or any cellular network or system.

The wireless communications system 100 comprises a radio network node 110 which is a base station and is therefore also is referred to as the base station 110. The radio network node 110 serves a cell 115. The radio network node 110 may in this example e.g. be an eNB, eNodeB, or a Home Node B, a Home eNode B, femto Base Station (BS), pico BS or any other network unit capable to serve a user equipment or a machine type communication device in a wireless communications system.

A first user equipment 121 is located within the cell 115. The user equipment 121 is in some figures referred to as UE 121, and is configured to communicate within the wireless communications system 100 via the radio network node 110 over a radio link 130 when the first user equipment 121 is present in the cell 115 served by the base station 110. The first user equipment 121 is capable of communicating with other user equipments such as a second user equipment 122 to be described below, or devices using wireless D2D communication over a D2D link 140.

In this example, the second user equipment 122 is also located within the cell 115. However, in other embodiments, the second user equipment 122 may be located in another cell which is adjacent to the cell 115. The second user equipment 122 is in some figures referred to as UE 122, and is configured to communicate within the wireless communications system 100 via the radio network node 110 or another base station serving the adjacent cell, over a radio link such as e.g. a radio link 150 when the second user equipment 122 is present in the cell 115 served by the base station 110 or in the adjacent cell served by the other base station. The second user equipment 122 is capable of communicating with other user equipments such as the first user equipment 121, or other devices using wireless D2D communication over the D2D link 140.

The second user equipment 122 is also a radio network node, and is therefore in some scenarios below related to as the radio network node 122.

The first user equipment 121 and the second user equipment 122 may e.g. be mobile terminals or wireless terminals, mobile phones, computers such as e.g. a laptop, Personal Digital Assistant (PDA) or tablet computers, sometimes referred to as surf plates, with wireless capability, devices equipped with a wireless interface, such as a printer or a file storage device or any other radio network unit capable of communicating over a D2D link and over a radio link in a cellular communications system.

The embodiments herein enable the first user equipment 121 reporting its current status of its internal resources, to facilitate the establishment of D2D communication. The current status of its internal resources relates to resources that are currently available in the first user equipment 121 for D2D communication. The resources relate to hardware resources, to combined hardware resources and radio resources, or to combined software resources, hardware resources and radio resources.

Therefore, the concept of the UE internal resource status relating to hardware resources, to combined hardware resources and radio resources, or to combined software resources, hardware resources and radio resources will first be described. In the subsequent, embodiments methods related to the procedure of acquiring this status and its usage will be disclosed.

UE Internal Resource Status

The UE internal resource status refers to the current status of one or more sets of internal UE resources, which are used by a user equipment such as the first user equipment 121 for maintaining the communication between itself and another wireless device such as the second user equipment 122, or the radio network node 110 acting as a serving radio network node. These resources relates to dynamic resources.

In D2D communication mode the first user equipment 121 may communicate with more than one wireless device. In this case the UE internal resource status may depict the resources used for maintaining communication with one or more than one or all wireless devices involved in D2D communication. By default it is assumed that the UE internal resource status refers to internal resources required for maintaining all communication links with all active devices in operation.

Examples of resources used by the first user equipment 121 relates to hardware resources, to combined hardware resources and radio resources, or to combined software resources, hardware resources and radio resources such as e.g. processing power for processing of the received and/or transmit signals, memory unit for storage of signals which are received or will be transmitted, remaining or total battery capacity, and/or remaining transmit power. Other examples are software resources, such as Operating System (OS)

capabilities. For example, the number of simultaneously ongoing processes, number of files that may be open are examples of OS resources. Such OS resources may be drastically different in high end smart phones versus small wireless sensors. The first user equipment 121 may have separate processors and memory units for baseband signals and for Radio Frequency (RF) signals. A baseband signal is a part of the signal that actually carries the information that needs to be passed from the transmitter to the receiver. The RF signal is created from the baseband signal by carrier frequency modulation such that the signal is suitable for transmission over the frequency channel that is available for the operator. In practice, wireless nodes, such as a user equipment or an access point have separate circuitries that handle the baseband and RF part of the signal and the signal transmission. The first user equipment 121 may have even separate resources such as e.g. memory and processors, for performing various types of tasks. Examples of tasks are measurements for maintenance and observation of radio links such as e.g. cell identification, signal strength of pilots and/or reference signals, channel estimation, baseband processing, RF processing, data reception and/or transmission.

The UE internal resource status may be a composite measure or a singular measure.

The composite UE internal resource status is used by the first user equipment 121 to report the status of two or more set of resources in a combined manner. For example it may comprise the first user equipment's 121 current usage of overall memory and overall processor. In another example it may comprise current usage of battery power, overall memory and overall processor. Yet in another example it may comprise current usage of battery power, baseband memory and baseband processor. The baseband memory and the baseband processor that take care of the baseband and RF processing are typically implemented by different circuitries in the first user equipment 121 and in the wireless node 110, 122. As such, they are separate hardware resources of the end-to-end signal processing and transmission chain of the radio link. Yet in another example it may comprise: usage of hardware resources, e.g. memory, processor and/or overall hardware. Also, the first user equipment 121 and the wireless node 110, 122 may have limited software (OS) resources, as explained above.

The singular UE internal resource status is used by the first user equipment 121 to report the status of each set of resources separately. For example it may comprise the first user equipment's 121 current usage of overall memory and overall processor. In another example it may comprise the first user equipment's 121 current usage of overall processor. Yet in another example it may comprise the first user equipment's 121 current usage of only baseband memory. Yet in another example it may comprise the first user equipment's 121 current usage of only baseband processor.

Both composite and singular UE internal resource status may be reported as an indication in various forms as explained:

In one example the UE internal resource status is indicated in terms of percentage of a reference value. The reference value may be a pre-defined value. Another possibility is that the reference value is the maximum amount of resources available and/or supported by the first user equipment 121. Assuming the reference value to be the maximum amount of first user equipment 121 resources, for example 70% hardware resource usage means that 30% hardware resources are currently unused. Alternatively the report may be indicated in terms of remaining composite or singular UE internal resource status.

In another example, the UE internal resource status is indicated in terms of grades. One example of such grades is: low, medium, high, very high. Another example of such grades is: medium, silver, gold. For example low UE internal resource status means that very low resources are currently used by the UE. Another example of grade is to express it on the numerical scale e.g. 0, 1, 2, 3, 4 and 5. For example 0 means very low usage and 5 means high usage etc.

Yet in another example the UE internal resource status may also be indicated in the same unit as that of the resource itself. For example the status in terms of memory can be expressed in terms of number of Kbits/Kbytes The first user equipment 121 may send the status reports periodically or in event triggered manner. In the former case the periodicity may be pre-defined or configurable by the network node 110, such as a serving base station. In the latter case the triggering of report may be based on a comparison with a threshold, which may be pre-defined or configurable by the network node 110.

The reported results may be based on time averaging. The averaging period (T0) may be pre-defined or configurable by the network node 110.

Embodiments herein may be implemented in a in a radio network node, which radio network node may be a base station such as the base station 110 according to a first scenario, or a user equipment such as the second user equipment 122 according to a second scenario.

Figure 2:
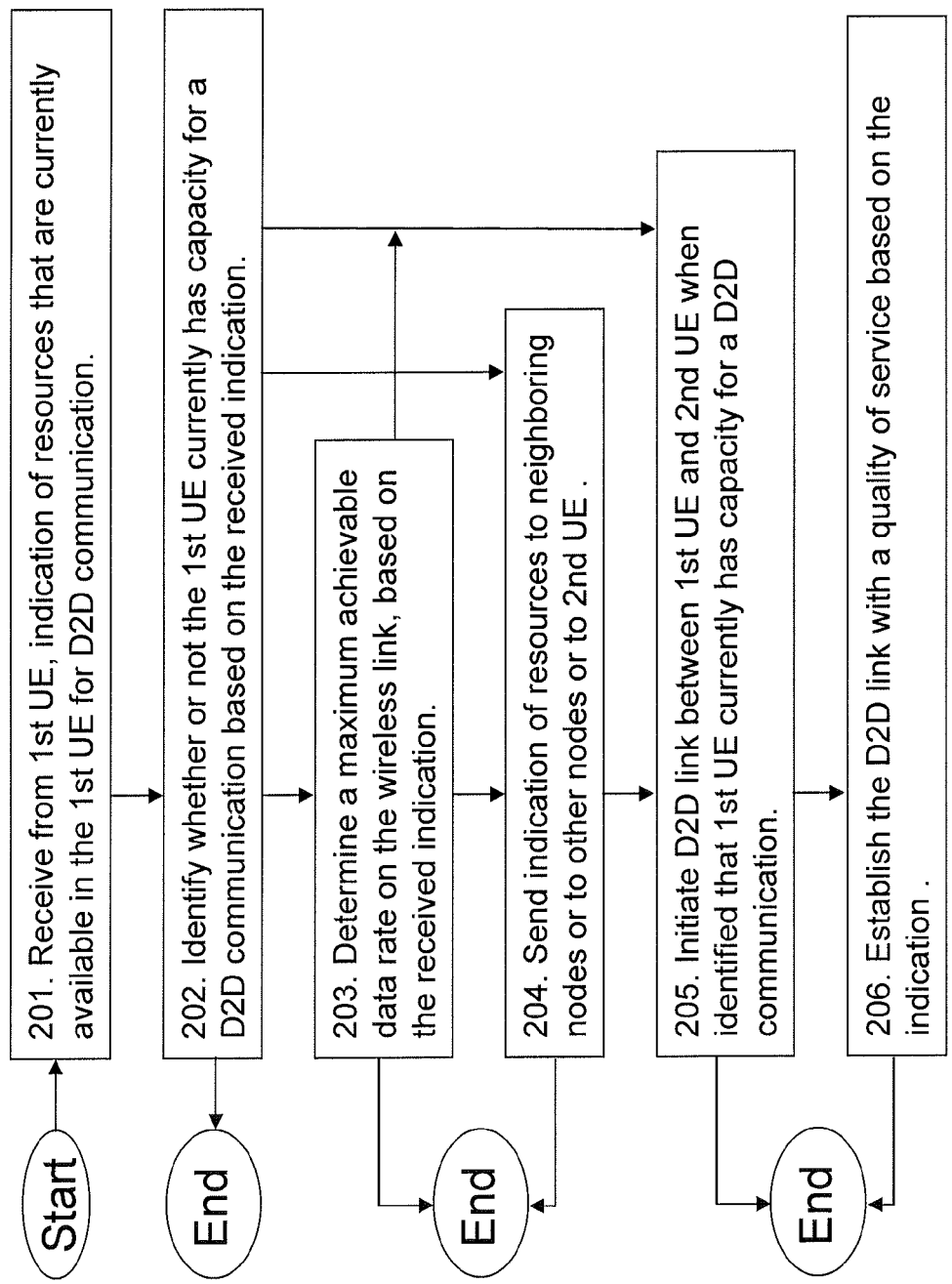
FIG. 2 is a flowchart depicting embodiments of a method in a radio network node.

According to the first scenario, embodiments of a method in a radio network node when being a base station such as the base station 110, for handling a D2D communication, will now be described with reference to the flowchart depicted in FIG. 2. The D2D communication is wireless and as mentioned above the radio network node 110 is comprised in a wireless communication system 100.

The method comprises the following actions, which actions may as well be carried out in another suitable order than described below.

Action 201

The first user equipment 121 has transmitted its current internal resource status to its serving node which in this action is received by the radio network node 110 being the serving node of the first user equipment 121.

This means that the radio network node 110 receives from the first user equipment 121, an indication of resources that are currently available in the first user equipment 121 for D2D communication. The resources relates to hardware resources, to combined hardware resources and radio resources, or to combined software resources, hardware resources and radio resources. The indication may be a common value or an aggregated value for resources that are currently available in the first user equipment 121 for D2D communication for the uplink and downlink. Alternatively the indication may be separate for the resources that are currently available in the first user equipment 121 for D2D communication in the uplink and downlink. From a D2D link establishment perspective, important information may be whether the first user equipment 121 is overall capable of maintaining a D2D link parallel with the cellular link or if the UE capability is confined by any of the internal resources. Therefore, a combined resource status may be useful for the radio network node 110 as being the serving node in determining the operational mode, i.e. D2D mode or cellular mode, for the first user equipment 121.

The first user equipment 121 uses different types of resources: hardware, radio and software resources for D2D or cellular communication. The hardware resources, combined hardware resources and radio resources, or combined software resources, hardware resources and radio resources may be referred to as dynamic recourses, as described above.

According to some embodiments, the indication of the resources comprises indication of internal resources of the first user equipment 121 which are used by the first user equipment 121 for maintaining a communication between the first user equipment 121 and the second user equipment 122 or, between the first user equipment 121 and the radio network node 110.

The indication of the available resources may comprise an indication of remaining or current resource usage of one or more of hardware resources such as transmit power, battery power, overall memory, overall processor, baseband memory, baseband processor and buffer status within the first user equipment 121.

The indication of the available resources may further comprise an indication of remaining or current resource usage of one or more of radio resources such as radio channel, physical channel, time and frequency resource, time slot, CDMA channelization codes, within the first user equipment 121. An example of time and frequency resource is a Resource Block (RB) which is used in LTE or in general in an OFDMA based system including Single Carrier Frequency Division Multiple Access (SC-FDMA). A RB in LTE comprises of 12 sub-carriers and 1 time slot in frequency and time domain respectively. Yet another example of time and frequency resource is a Resource Element (RE) which is also used in LTE. A RE in LTE comprises of 1 sub-carrier and 1 OFDMA symbol in frequency and time domain respectively.

As described above, this current internal resource status information may be a composite measure in which case it may comprise multiple measures such as remaining transmit power of the first user equipment 121, current buffer status, battery status and remaining processing power or a single measure such as usage of processor, i.e. singular internal resource status. All of these types of status information may be indicated and reported by different mechanisms as will be explained more in detail below.

Since in network assisted D2D communications, the base stations are aware of the D2D link and the first and second user equipments have a control plane association with the radio network node 110, various means for internal resource status reporting to the base station may be used. For example, internal resource status may be reported by the first user equipment 121 to the radio network node 110 at cellular connection establishment, or periodically while a user equipment-base station connection exists. Furthermore the first user equipment 121 may report to the radio network node 110, the internal resource status proactively or upon receiving an explicit request from the radio network node 110 or based on both approaches.

The radio network node 110 may comprise a user equipment status data base in which status and capabilities of the currently served user equipments are stored. The received indication of current dynamic resources may be stored in this data base. In this way this user equipment status data base is updated.

Action 202

The radio network node 110 may use the reported status information for deciding that the first user equipment 121 has capability for a D2D communication and in other embodiments described below, for various other purposes.

In this action, the radio network node 110 identifies whether or not the first user equipment 121 currently has capacity for a D2D communication based on the received indication.

If it is identified that the first user equipment 121 currently has capacity, it is possible for the first user equipment 121 to set up a D2D communication to a device or to another user equipment such as the second user equipment 122 being neighbouring to the first user equipment 121.

The radio network node 110 may further use the received status information for determining whether a communication between the first user equipment 121 and the second user equipment 122 shall be performed via the radio network node 110 or via a D2D link based on the received indication. This means that the radio network node 110 determines whether a communication between the first user equipment 121 and the second user equipment 122 shall be set up via a base station such as the radio network node 110, or via a D2D link based on the received indication.

For example to determine the communication mode of the UE pair, in this example the first user equipment 121 and the second user equipment 122, that is to execute mode selection, wherein the radio network node 110 decides whether the devices, i.e. the first user equipment 121 and the second user equipment 122 should use a direct D2D link or whether they should be communicating via the radio network node 110.

Action 203

In some embodiments, the radio network node 110 uses the reported status information for determining a maximum achievable data rate on a wireless link between the first user equipment 121 and the radio network node 110. This is advantageous, because if this peak rate is too low, then direct D2D communications may be preferable over the cellular communication mode, that is when communication is performed via the radio network node 110. On the other hand, if this peak rate is sufficiently high, then direct D2D communication may not be desirable. In other words, the maximum achievable data rate provides input information to the mode selection algorithm of the wireless node 110.

In these embodiments, the radio network node 110 communicates with the first user equipment 121 over the wireless link 131. The radio network node 110 determines a maximum achievable data rate on the wireless link, based on the received indication.

Action 204

In some embodiments, the radio network node 110 sends the indication of the resources that are currently available in the first user equipment 121 for D2D communication to neighboring nodes or to other network nodes. This may be performed by broadcasting or signaling.

This means e.g. that the radio network node 110 may forward the received indication of the resources that are currently available in the first user equipment 121 for D2D communication such as UE internal status information to one or more network nodes as described below. The reporting of the UE internal status information may be done proactively by the radio network node 110 or it may be done upon receiving an explicit request from a target node.

In one example the radio network node 110 may forward the indication of the resources that are currently available in the first user equipment 121 for D2D communication such as the received UE internal status information to neighboring base stations. For example the radio network node 110 may send such as e.g. by broadcasting a summary of UE internal resources within its serving area. The status information may be exchanged over X2 interface between eNode Bs in LTE.

The neighboring base stations may use this information for assigning resources to the first user equipment 121 for D2D and/or cellular link after a cell change.

In a second example the radio network node 110 may also forward the indication of the resources that are currently available in the first user equipment 121 for D2D communication such as the received UE internal status information to other network nodes. Examples of other network nodes are: Self Organizing Network (SON) node, a Minimization of Drive Tests (MDT) node, an operational support system (OSS) node, an operational and maintenance (O&M) node, and Network monitoring node.

These other network nodes may use the received indication of the resources that are currently available in the first user equipment 121 for D2D communication such as the UE internal status information for one or more network management and planning tasks. Examples of such tasks are:

Configuration or tuning of network parameters e.g. handover margin, cell selection threshold, and measurement configuration parameter Setting or modification of radio resources e.g. cell BW, antenna configuration and base station output power.

Planning and deployment of network nodes e.g. eNode B, and relays.

Upgrading of network e.g. addition of carriers, and Radio Access Technologies (RATs).

Yet in a third example the radio network node 110 may also forward the received indication of the resources that are currently available in the first user equipment 121 for D2D communication such as UE internal status information to a positioning node e.g. to Evolved Serving Mobile Location Center (E-SMLC) using LTE positioning protocol annex (LPPa) in LTE. The positioning node may use the indication of the resources that are currently available in the first user equipment 121 for D2D communication such as the UE resource status information, to decide whether to request first user equipment 121 to perform certain positioning measurement or not. The positioning node may also use the indication of the resources that are currently available in the first user equipment 121 for D2D communication such as the UE resource status information for selecting certain parameters which are used by the UE for performing the positioning measurements.

When the radio network node 110 uses broadcasting, it encodes the identity of the first user equipment 121 and the currently available resources in the broadcast message. The radio network node 110 may also send the status information about the first user equipment 121 to the second user equipment 122 in a dedicated signaling, also known as user equipment specific signaling. When the radio network node 110 signals, it uses a direct interface, such as an X2 signaling interface towards the neighboring node or LPPa interface when signaling to a positioning node in LTE.

According to some embodiments, the radio network node 110 sends the indication of the resources that are currently available in the first user equipment 121 for D2D communication to the second user equipment 122. This may be performed by broadcasting or signaling. For example the radio network node 110 also forwards the received indication of status information to user equipments within is served cell, such as to the second user equipment 122, to be used for assisting D2D establishment. A scenario when the second user equipment 122 receives the indication will be further described in relation to FIG. 3 below.

The radio network node 110 may broadcast the indication periodically or aperiodically on current UE capabilities and UE internal resource status. The broadcasted indication is based on or derived from the indication received from the first user equipment 121 in Action 201. To keep the load on the broadcast channel low, this broadcasting may be performed with very low periodicity as compared to the state of the art system information broadcast. For example, it may be in the order of hundreds of milliseconds or even seconds. Furthermore such indication may be broadcasted on specific part of the channel e.g. on a specific system information block solely for this information in the form of the indication.

In some embodiments, the radio network node 110 takes part of the information maintained in a user equipment status data base available in its served area e.g. by signalling or broadcasting as described above. This turns out to be useful in a user equipment initiated D2D link establishment as described above under background, and as further described in relation to FIG. 3 below.

Action 205

A serving node, e.g. a base station may take into account the reported user equipments internal resource situation when establishing D2D link between user equipments. For example, the radio network node 110 may initiate a D2D link between the first user equipment 121 and the second user equipment 122 when it is identified that the first user equipment 121 currently has capacity for a D2D communication. The network node 110 uses known techniques, known as D2D mode selection techniques, to determine the optimal communication mode for a D2D pair in terms of the available radio resources. According to the present disclosure, when the radio network node 110 has determined that the D2D mode is advantageous in terms of the available radio resources, the radio network node 110 also checks whether or not the resources that are currently available in the first user equipment 121 for D2D communication such as the UE internal resources, are sufficient for the establishment of the D2D link.

Action 206

In some embodiments, the radio network node 110 establishes the D2D link with a quality of service based on the indication. The radio network node 110 may use the indication of the resources that are currently available in the first user equipment 121 for D2D communication such as the UE available internal resources, and the desired QoS on the D2D link to decide on the operational mode, that is cellular or direct D2D communication. For example, if the resources that are currently available in the first user equipment 121 for D2D communication are indicated as medium class, and the desired QoS is indicated as gold class, then the radio network node 110 may decide that establishing the direct D2D link is not desirable.

Figure 3:
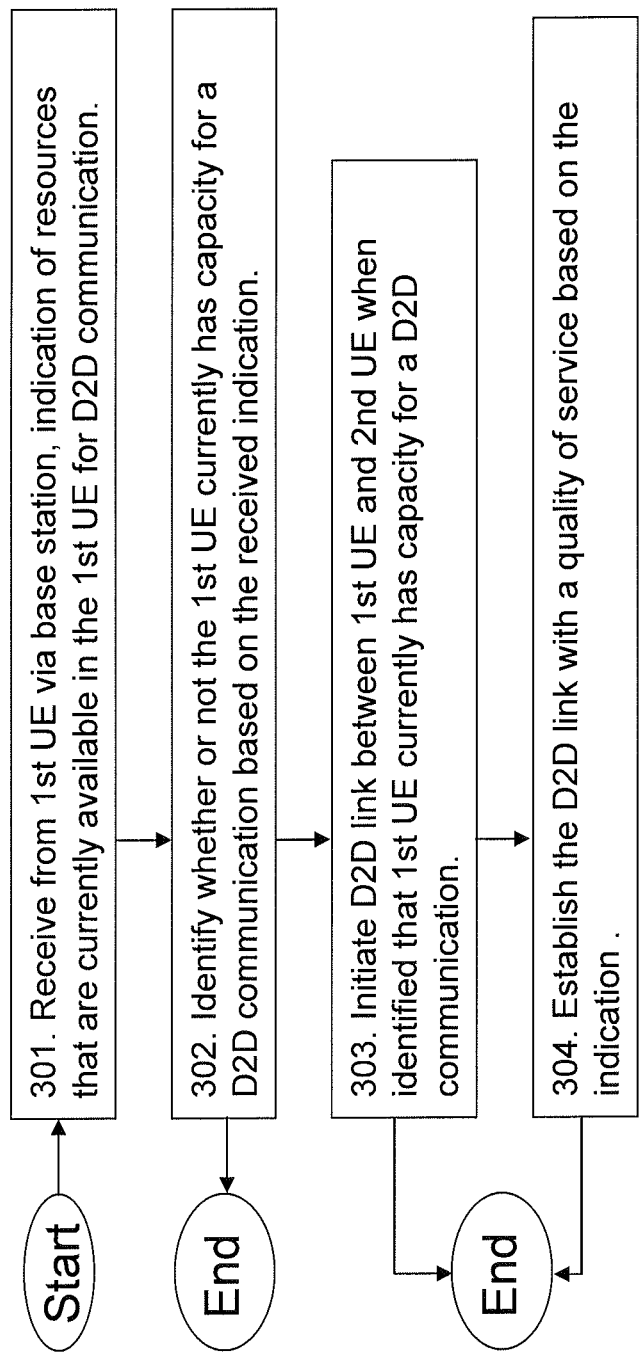
FIG. 3 is a flowchart depicting embodiments of a method in a radio network node.

According to the second scenario, embodiments of a method in the radio network node 122 when being a user equipment such as the second user equipment 122 for handling a D2D communication will now be described with reference to the flowchart depicted in FIG. 3. As mentioned above the D2D communication is wireless and the radio network node 122 is comprised in the wireless communication system 100.

The first user equipment 121 has transmitted an indication of its current internal resource status to its serving node which has been received by the base station 110 being the serving node of the first user equipment 121. In the second scenario embodiments, the base station 110 has forwarded the indication of the resources that are currently available in the first user equipment 121 for D2D communication to the second user equipment 122 as described above under Action 204. This may mean that the base station 110 also forwards the received indication to user equipments within is served cell, such as to the second user equipment 122, to be used for assisting D2D establishment.

The method comprises the following actions, which actions may as well be carried out in another suitable order than described below.

Action 301

In this action the radio network node 122 receives from the first user equipment 121 via the base station 110, an indication of resources that are currently available in the first user equipment 121 for D2D communication. The resources relates to hardware resources, to combined hardware resources and radio resources, or to combined software resources, hardware resources and radio resources. The hardware resources, combined hardware resources and radio resources, or combined software resources, hardware resources and radio resources may be related to as dynamic resources.

According to some embodiments, the indication of the resources comprises indication of internal resources of the first user equipment 121 which are used by the first user equipment 121 for maintaining a communication between the first user equipment 121 and the second user equipment 122 or, between the first user equipment 121 and the base station 110.

The indication of the available resources may further comprise an indication of remaining or current resource usage of one or more of radio resources such as radio channel, physical channel, time and frequency resource, time slot, and CDMA channelization codes within the first user equipment 121. An example of time and frequency resource is a Resource Block (RB) which is used in LTE or in general in an OFDMA based system including Single Carrier Frequency Division Multiple Access (SC-FDMA). A RB in LTE comprises of 12 sub-carriers and 1 time slot in frequency and time domain respectively. Yet another example of time and frequency resource is a Resource Element (RE) which is also used in LTE. A RE in LTE comprises of 1 sub-carrier and 1 OFDMA symbol in frequency and time domain respectively.

As described above, this current internal resource status information may be a composite measure in which case it may comprise multiple measures such as remaining transmit power of the first user equipment 121, current buffer status, battery status and remaining processing power or a single measure such as usage of processor, i.e. singular internal resource status. All of these types of status information may be indicated and reported by different mechanisms as explained more in detail above.

The indication of the resources that are currently available in the first user equipment 121 for D2D communication is received by the radio network node 122, i.e. the second user equipment 122 e.g. by reading the broadcast information from the base station 110, which may be performed periodically or aperiodically. The broadcasted indication of the available resources is based on or derived from the indication received from the first user equipment 121 as described in Action 201. To keep the load on the broadcast channel low, this broadcasting may be performed with very low periodicity as compared to the state of the art system information broadcast. For example, it may be in the order of hundreds of milliseconds or even seconds. Furthermore such indication may be broadcasted on specific part of the channel e.g. on a specific system information block solely for this information in the form of the indication.

As described above, this current internal resource status information may be composite measure in which case it may comprise multiple measures such as remaining transmit power of the first user equipment 121, current buffer status, battery status and remaining processing power or a single measure such as usage of processor, i.e. singular internal resource status. All of these types of status information may be indicated and reported by different mechanisms as will be explained below.

The network node 110 may maintain a data base in which indication of the available resources such as the UE internal resource status information and capabilities of the user equipments are stored. The data base may also be located in a separate node. The received indication of the available resources may change over time. Therefore the data base may be updated whenever there is a change. In this way this neighboring user equipment status data base is updated. The stored information is used for various purposes such as for initiating D2D links or for broadcasting to other user equipments in a cell or for signaling the indication of the available resources such as the UE internal resource status information to various other network nodes.

Action 302

The second user equipment 122 identifies whether or not the first user equipment 121 currently has capacity for a D2D communication based on the received indication.

The second user equipment 122 uses the reported status information for deciding that the first user equipment 121 has capability for a D2D communication. This means that the second user equipment 110 decides that the first user equipment 121 has capability for a D2D communication based on the received indication. This also means that it is possible for the second user equipment to set up a D2D communication to a device or to another user equipment such as the first user equipment 121 being neighboring to the second user equipment 122.

The second user equipment 122 awaits and decodes broadcast information on the status of the first user equipment 121 currently served in the cell 115. In user equipment initiated D2D link establishment as in this second scenario, the second user equipment 122 then use this status information to decide whether to initiate a D2D link towards the first user equipment 121 and to prepare for the establishment of the D2D link with proper QoS as will be described in Actions below. For example, if the second user equipment 122 learns that the first user equipment 121 can only support a low rate D2D link due to high usage of the internal resources, then second user equipment 122 also prepares for a low rate D2D bearer for the first user equipment 121.

Action 303

The radio network node 122 may initiate a D2D link between the first user equipment 121 and the radio network node 122, i.e. the second user equipment 122, when it is identified that the first user equipment 121 currently has capacity for a D2D communication. In this case the radio network node 122 decides to establishing the D2D link between the first and second user equipments. The radio network node 122 then assigns or allocates radio resources to the first and second user equipments 121, 122 for establishing the D2D communication between them.

Action 304

The second user equipment 122 may establish the D2D link with a quality of service based on the indication.

In case of network initiated D2D link establishment, the radio network node 110 assigned resources for D2D communication dependent on the available internal resources at the first user equipment 121. The resources are assigned provided that the target quality of service can be met over D2D link. In case of user equipment initiated D2D link establishment the second user equipment 122 takes into account the first user equipment 121 status information, e.g. acquired from the radio network node 110 via broadcast or dedicated signaling, when setting a target communication link e.g. a target bit rate.

Figure 4:
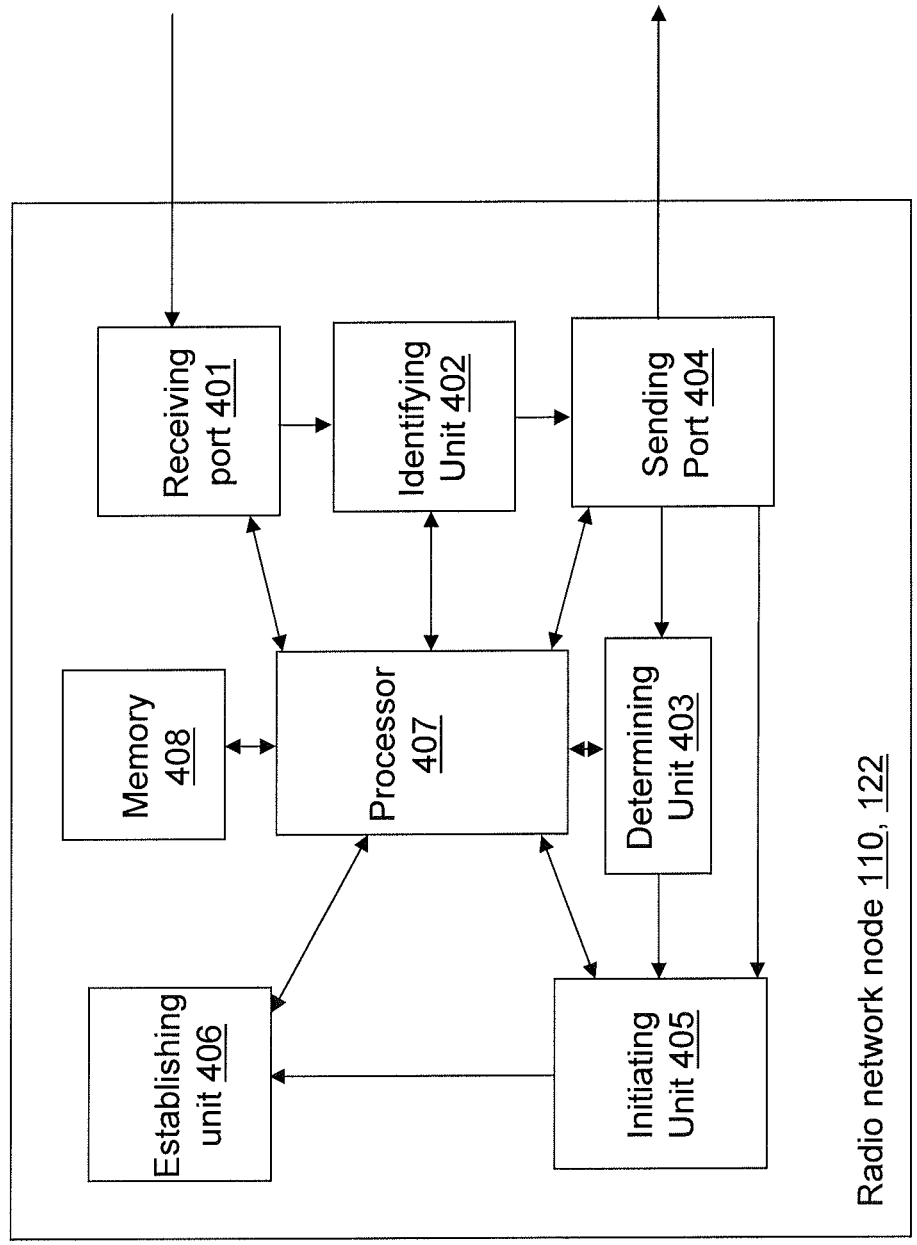
FIG. 4 is a schematic block diagram illustrating embodiments of a radio network node.

To perform the method actions in the radio network node 110, 122 described above in relation to FIG. 2 and FIG. 3, for handling a D2D communication, the radio network node 110, 122 comprises the following arrangement depicted in FIG. 4. As mentioned above the D2D communication is wireless, and the radio network node 110, 122 is comprised in the wireless communication system 100.

The radio network node 110, 122 comprises a receiving port 401 configured to receive from the first user equipment 121, an indication of resources that are currently available in the first user equipment 121 for D2D communication. The resources relates to hardware resources, to combined hardware resources and radio resources, or to combined software resources, hardware resources and radio resources. The hardware resources, combined hardware resources and radio resources, or combined software resources, hardware resources and radio resources may be referred to as dynamic.

According to some embodiments, the indication of the resources comprises indication of internal resources of the first user equipment 121 which are used by the first user equipment 121 for maintaining a communication between the first user equipment 121 and the second user equipment 122 or, between the first user equipment 121 and the base station 110.

The indication of the available resources may comprise an indication of remaining or current resource usage of one or more of hardware resources such as transmit power, battery power, overall memory, overall processor, baseband memory, baseband processor and buffer status within the first user equipment 121.

The indication of the available resources may further comprise an indication of remaining or current resource usage of one or more of radio resources such as radio channel, physical channel, time and frequency resource, time slot, and CDMA channelization codes within the first user equipment 121.

The radio network node 110, 122 comprises an identifying unit 402 configured to identify whether or not the first user equipment 121 currently has capacity for a D2D communication based on the received indication. The identifying unit 402 may further be configured to determine whether a communication between the first user equipment (121) and a second user equipment 122 shall be set up via a base station or via a D2D link, based on the received indication.

In some embodiments wherein the radio network node 110 is a base station, the radio network node 110 may further comprise a determining unit 403 configured to, when the radio network node 110 communicates with the first user equipment 121 over a wireless link, determine a maximum achievable data rate on the wireless link, based on the received indication.

The radio network node 110, 122 may further comprise a sending port 404 configured to send the indication of the resources that are currently available in the first user equipment 121 for D2D communication, to neighboring nodes or to other network nodes. The sending port 404 may further be configured to send the indication of the resources that are currently available in the first user equipment 121 for D2D communication to a second user equipment 122. This may be performed by broadcasting or signaling as mentioned above.

The radio network node 110, 122 may further comprise an initiating unit 405 configured to initiate a D2D link between the first user equipment 121 and the second user equipment 122 based an identification that the first user equipment 121 currently has capacity for a D2D communication.

The radio network node 110, 122 according to claim 21, may further comprise an establishing unit 406 configured to establish the D2D link with a quality of service based on the indication.

The radio network node 110, 122 may be a base station 110. However according to some embodiments, the radio network node is a second user equipment 122, wherein the indication is received via the base station 110, e.g. by broadcasting or sending user specific signaling as described above.

The embodiments herein for handling a D2D communication may be implemented through one or more processors, such as, a processor 407 in the radio network node 110, 122 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the radio network node 110, 122. One such carrier may be in the form of a CD ROM disc. It is however feasible with other data carriers such as a memory stick. The computer program code may furthermore be provided as pure program code on a server and downloaded to the radio network node 110, 122.

The radio network node 110, 120 may further comprise a memory 408 comprising one or more memory units. The memory 650 is arranged to be used to store data such as, the indication of resources that are currently available in the first user equipment 121 for D2D communication, received data streams, data streams to be transmitted, UE capabilities, information associated with scheduling, and applications to perform the methods herein when being executed in the radio network node 110, 122.

Those skilled in the art will also appreciate that the identifying unit 402, the determining unit 403, the initiating unit 405, and the establishing unit 406 described above may refer to a combination of analog and digital circuits, and/or one or more processors configured with software and/or firmware (e.g., stored in memory) that, when executed by the one or more processors such as the processor 407, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The embodiments described above may also be used in a wireless communication network without D2D wireless communication. An examples of scenario without D2D communication where embodiments are applicable comprises simultaneous operation, i.e. signal transmission and/or reception, involving different location or sites. For example the first user equipment 121 may receive signals from and/or transmit signals to a plurality of non co-located base stations. Non co-located base stations means base stations, possibly of different radio access technologies, that are not located on the same geographical site and there may not even be communication between them.

The multiple links involved in operation may operate over the same or different carriers. The multiple links may also belong to different RATs i.e. multi-RAT operation involving LTE and CDMA2000. In another example the multi-RAT operation may comprise any combination of LTE, CDMA2000 1x RTT, High Rate Packet Data (HRPD), UMTS Terrestrial Radio Access (UTRA) Frequency Division Duplexing (FDD), UTRA Time Division Duplexing (TDD), and GERAN where at least 2 RATs operate from non co-located radio network nodes or base stations. In another example the RATs or carriers may carry different or same services e.g. LTE carrier may carry data whereas CDMA2000 may carry voice service. 1xRTT is an operating mode of CDMA wireless technology. Such operation involving multiple non co-located network nodes may also belong to multipoint transmission and/or reception arrangement. It is also interchangeably called as Distributed Antenna Systems (DAS) or Common Multipoint Transmission and/or reception (CoMP). Such operation involving multiple sites may also belong to multi-carrier or carrier aggregation system.

In any of the above mentioned arrangements which comprises at least two non co-located nodes or base stations wherein at least one node or base station is not aware of UE internal resource used due to operation on another carrier or RAT. Therefore there is no means for an individual node to determine if the user equipment is also configured by any another node for another service. According to another embodiment the user equipment 121 may report its internal resource status information relating to hardware resources, to combined hardware resources and radio resources, or to combined software resources, hardware resources and radio resources, to the serving network node and also to another network node (e.g. secondary network node) which wants to initiate the communication over the second link. The second link may be established for another session or service or for the same service. For example a typical scenario is that of a multi-mode terminal which may be independently configured to operate LTE e.g. for data, and CDMA2000 e.g. for voice by the LTE eNode B and CDMA2000 base station controller, or a CDMA2000 base station respectively. The eNB and CDMA2000 BS are either non co-located or they may be located but don't have any means to communicate with each other. As an example assume the first user equipment 121 is operating on CDMA2000 for voice call. The radio network node 110 being an LTE eNodeB in this example wants to establish the data communication link, The first user equipment 121 using the embodiment reports its internal resource status, i.e. resources used by CDMA2000 voice call or the remaining resources or the resources npt used by CDMA2000, to the LTE eNodeB prior to establishment of the data call using LTE. If the first user equipment 121 has sufficient remaining resources as indicated by the UE internal resource status then the eNodeB will establish the data call. The LTE eNodeB may also assign resources for data communication or set the quality target depending upon the available or remaining UE internal resources. Otherwise if there are insufficient remaining resources at the first user equipment 121, the eNodeB may not establish the data call or it may establish a very low bit rate channel for data communication to make sure that the quality target is met.

Yet another example is that of the use of Open mobile alliance (OMA) LTE positioning protocol extensions (LPPe). In this example any network node (e.g. UTRA FDD or CDNMA2000 network node) uses the OMA LPPe to configure the multi-mode UEs (e.g. supporting LTE and UTRA FDD) for performing positioning measurements on a non-LTE RAT (e.g. UTRA FDD). In this case eNode B is unaware of non-LTE RAT positioning measurements which consume UE internal resources. Therefore in this example it is also beneficial that the first user equipment 121 reports its internal resource status to the radio network node 110 in this example being an eNode B, which can take the received status information into account in order to take appropriate actions. For example the eNode B may not establish the communication with the first user equipment 121 if currently there are insufficient resources available at the first user equipment 121. Alternatively the eNode B may establish a low bit rate data channel which the first user equipment 121 may handle and thus the target quality can be met.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a second user equipment for handling a Device-to-Device, D2D, communication, which D2D communication is wireless, and which second user equipment is comprised in a wireless communication system, the method comprising:
   receiving over a cellular link via a radio network node serving a first user equipment, an indication of resources of the first user equipment, the indication of resources comprising:
      an indication of current memory resource usage or buffer status of first user equipment in maintaining a current cellular communication with the radio network node over the cellular link and an indication of memory or buffer resources that are currently available in the first user equipment for D2D communication over D2D link, which memory or buffer resources relates to hardware resources, to combined hardware resources and radio resources, or to combined software resources, hardware resources and radio resources,
   identifying, based at least in part on the received indication, whether or not the first user equipment currently has capacity for simultaneously maintaining D2D communication with the second user equipment over the D2D link and a cellular communication with the radio network node over the cellular link.

2. The method according to claim 1, wherein the hardware resources, combined hardware resources and radio resources, or combined software resources, hardware resources and radio resources are dynamic.

3. The method according to claim 1, wherein the indication of the available memory or buffer resources further comprises indication of remaining or current resource usage of one or more of: transmit power, battery power, overall processor, baseband memory, baseband processor, radio channel, physical channel, time and frequency resource, time slot, CDMA channelization codes, within the first user equipment.

4. The method according to claim 1, wherein the radio network node is a base station and wherein the radio network node communicates with the first user equipment over a wireless link, the method further comprising:
   determining a maximum data rate on the wireless link, based on the received indication.

5. The method according to claim 1, wherein the identifying whether or not the first user equipment currently has capacity for D2D communication based on the received indication, further comprises determining whether a communication between the first user equipment and a second user equipment shall be set up via a base station or via the D2D link, based on the received indication.

6. The method according to claim 1, further comprising:
sending the indication of the memory or buffer resources that are currently available in the first user equipment for D2D communication, to neighboring nodes or to other network nodes.

7. The method according to claim 1, further comprising:
sending the indication of the memory or buffer resources that are currently available in the first user equipment for D2D communication to a second user equipment.

8. The method according to claim 1, wherein the radio network node is a base station.

9. The method according to claim 1, further comprising:
initiating the D2D link between the first user equipment and the second user equipment when it is identified that the first user equipment currently has capacity for D2D communication.

10. The method according to claim 9, further comprising:
establishing the D2D link with a quality of service based on the indication.

11. A second user equipment for handling a Device-to-Device, D2D, communication, which D2D communication is wireless, the second user equipment comprising:
a receiving port configured to receive over a cellular link via a radio network node serving a first user equipment, an indication of resources of the first user equipment, the indication of resources comprising:
an indication of current memory resource usage or buffer status of first user equipment in maintaining a current cellular communication with the radio network node over the cellular link and an indication of memory or buffer resources that are currently available in the first user equipment for D2D communication over a D2D link, which memory or buffer resources relates to hardware resources, to combined hardware resources and radio resources, or to combined software resources, hardware resources and radio resources,
an identifying unit configured to identify, based at least in part on the received indication, whether or not the first user equipment currently has capacity for simultaneously maintaining D2D communication with the second user equipment over the D2D link and a cellular communication with the radio network node over the cellular link.

12. The second user equipment according to claim 11, wherein the hardware resources, combined hardware resources and radio resources, or combined software resources, hardware resources and radio resources are dynamic.

13. The second user equipment according to claim 11, wherein the indication of the available memory or buffer resources further comprises indication of remaining or current resource usage of one or more of: transmit power, battery power, overall processor, baseband memory, baseband processor, radio channel, physical channel, time and frequency resource, time slot, CDMA channelization codes, within the first user equipment.

14. The second user equipment according to claim 11, wherein the identifying unit further is configured to determine whether a communication between the first user equipment and a second user equipment shall be set up via a base station or via the D2D link, based on the received indication.

15. The second user equipment according to claim 11, further comprising:
a sending port configured to send the indication of the resources that are currently available in the first user equipment for D2D communication, to neighboring nodes or to other network nodes.

16. The radio network node according to claim 11, wherein the radio network node is a base station.

17. The second user equipment according to claim 11, further comprising:
an initiating unit configured to initiate the D2D link between the first user equipment and the second user equipment based on an identification that the first user equipment currently has capacity for D2D communication.

18. The second user equipment according to claim 17, further comprising:
an establishing unit configured to establish the D2D link with a quality of service based on the indication.

* * * * *